US005812175A

United States Patent [19]

Kerr et al.

[11] Patent Number: 5,812,175

[45] Date of Patent: Sep. 22, 1998

[54] LASER THERMAL PRINTER WITH REVERSIBLE IMAGING DRUM ROTATION FOR PRINTING MIRROR IMAGES

[75] Inventors: Roger S. Kerr, Brockport; John D. Gentzke, Rochester, both of N.Y.

[73] Assignee: Eastman Kodak Company, Rochester, N.Y.

[21] Appl. No.: 724,490

[22] Filed: Sep. 30, 1996

[51] Int. Cl.[6] .............................. B41J 2/45; G01D 15/14; G01D 9/42; H04N 1/23

[52] U.S. Cl. .............................. 347/238; 346/107.1

[58] Field of Search .............................. 347/238, 237; 399/179; 346/107.1, 105, 139 D

[56] References Cited

U.S. PATENT DOCUMENTS

| | | | |
|---|---|---|---|
| 5,151,797 | 9/1992 | Nosaki et al. | 358/474 |
| 5,220,348 | 6/1993 | D'Aurelio | 347/236 |
| 5,258,776 | 11/1993 | Guy et al. | 347/237 |
| 5,276,464 | 1/1994 | Kerr et al. | 346/134 |
| 5,315,320 | 5/1994 | Murano | 347/180 |

*Primary Examiner*—N. Le
*Assistant Examiner*—Thinh Nguyen
*Attorney, Agent, or Firm*—Nelson Adrian Blish

[57] ABSTRACT

The present invention is for an imaging processor for thermal print medium. The image processor comprises a vacuum imaging drum (110) for holding thermal print medium (40) and donor sheets (120) in registration on the imaging drum (110). A printhead (200) moves along a line parallel to a longitudinal axis (X) of the imaging drum (110) as the imaging drum (110) rotates. The printhead (200) receives information signals and produces radiation which is directed to the donor (120) which causes dye to transfer from the donor (120) to the thermal print medium (40). When the imaging drum (110) is rotated in a first direction, a direct image is produced. When the direction of the imaging drum (110) is reversed, a mirror image is produced.

9 Claims, 5 Drawing Sheets

LASER THERMAL PRINTER WITH REVERSIBLE IMAGING DRUM ROTATION FOR PRINTING MIRROR IMAGES

BACKGROUND OF THE INVENTION

1. Field of the Invention

This invention relates to image processors in general and in particular to a laser thermal printer having the capability of printing images in a forward direction and a reverse direction.

2. Background Art

Color proofing is the procedure used by the printing industry for creating representative images without the cost and time required to actually set up a high-speed, high-volume, printing press to produce an example of the intended images. One such commercially available machine is a color proofer, a type of thermal printer, having half-tone color proofing capabilities described in commonly assigned U.S. Pat. No. 5,276,464. This color proofer is arranged to form an image on a thermal print medium in which dye from a donor is transferred to the thermal print medium when a sufficient amount of thermal energy to form the intended image is received by the donor. The color proofer comprises generally a material supply; lathe bed scanning subsystem that includes a scanning frame, translation drive, printhead, and vacuum imaging drum; and an exit transport.

The operation of the color proofer comprises removing a portion of the thermal print medium from a supply; transporting the cut thermal print medium to a vacuum imaging drum; and registering, wrapping, and securing the thermal print medium onto the vacuum imaging drum. A length of donor is then removed from the supply, measured and cut to length, transported to the vacuum imaging drum, wrapped around the vacuum imaging drum, and superposed in the desired registration to the thermal print medium already secured to the vacuum imaging drum.

After the donor material is secured to the periphery of the vacuum imaging drum, a linear translation system moves the printhead axially along the vacuum imaging drum, in coordination with the rotating vacuum imaging drum, to produce an image on the thermal print medium. The printhead is mounted on a rotatable lead screw having a threaded shaft. The lead screw rests between two sides of the scanning frame where it is supported on both ends by bearings. At a drive end, the lead screw continues through the bearing, through a pair of spring retainers that are separated and loaded by a compression spring and to a drive motor. The drive motor induces rotation to the screw, and the compression spring functions to limit axial movement of the lead screw.

The printhead is attached to the threaded shaft of the lead screw by a drive nut which is configured to move the printhead along the threaded shaft as the lead screw is rotated by the drive motor. The lateral movement of the printhead is controlled by switching the direction of rotation of the lead screw.

The printhead includes a plurality of diode lasers which can be individually modulated to supply energy to selected areas of the donor in accordance with an information signal. The printhead includes one end of a fiber optic array having a plurality of optical fibers coupled to the diode lasers. The printhead moves parallel to the longitudinal axis of the vacuum imaging drum. The dye is transferred to the thermal print medium as the radiation, transferred from the diode lasers to the donor by the optical fibers, and is converted to thermal energy in the donor.

After an image has been written on the thermal print medium, the donor material is removed from the vacuum imaging drum, without disturbing the thermal print medium, and transported out of the color proofer by an exit transport. Additional sheets of donor material are sequentially superposed with thermal print medium on the vacuum imaging drum and are imaged onto the thermal print medium receiver until the intended image is completed. The completed image on the thermal print medium is then unloaded and transported to an external holding tray on the color proofer by the exit transport.

The vacuum imaging drum is cylindrical in shape and includes a hollowed-out interior portion. It further includes a plurality of holes extending through its housing for permitting a vacuum to be applied from the interior of the vacuum imaging drum for supporting and maintaining position of the thermal print medium as the vacuum imaging drum rotates. The ends of the vacuum imaging drum are closed by cylindrical plates, each of which is provided with a centrally disposed spindle which extends outwardly therefrom through support bearings. The drive end spindle extends through the bearing and is stepped down to receive a drive motor armature secured by means of a nut.

A motor stator is stationarily held by a frame member, encircling the armature to form a reversible, variable speed drive motor for the vacuum imaging drum. At the end of the drum spindle an encoder is mounted to provide a timing signal. The opposite spindle is provided with a central vacuum opening that is in alignment with a vacuum fitting which has an external flange that is rigidly mounted to the scanning frame. The vacuum fitting has an extension which extends within but is closely spaced from the vacuum spindle. With this configuration, a slight vacuum leakage channel is provided between the outer diameter of the vacuum fitting and the inner diameter of the opening of the vacuum spindle which assures that no contact exists between the vacuum fitting and the vacuum imaging drum which might impart uneven movement or jitter to the vacuum imaging drum during its rotation. The opposite end of the vacuum fitting is connected to a high-volume vacuum pump which is capable of producing a vacuum of 50–60 inches of water at a volume of 60–70 cfm. The outer surface of the vacuum imaging drum is provided with an axially extending flat, which extends approximately eight degrees of the vacuum imaging drum circumference.

Although the presently known and utilized color proofer is satisfactory, there is room for improvement. In a laser thermal printer, as the imaging drum spins, the printhead moves along the imaging drum in a path that is parallel to the longitudinal axis of the imaging drum. A translator drive moves the printhead in the "slow scan" direction, from a home position (at the point where it begins writing the image data) to the opposite end of the drum. The combined movement of the printhead and the imaging drum rotation perpendicular to the motion of the printhead causes the resulting image to be written in a single, continuous helix about the writing drum. However, the image may need to be written either directly to a receiver, such as paper, press stock, or printing plate; or to an intermediate, which requires a mirror image, which is then transferred onto paper or press stock by a laminator device. The image being proofed may also have been scanned in reverse, thus, also requiring a mirror image print.

The image, when applied to an intermediate, is a mirror image relative to the image applied to a direct receiver. Mirroring this data requires that pixels be written in a different order. The raster color proofer (RIP) that converts image file data into actual pixels must perform this conversion in a mirrored fashion for the intermediate receiver. For existing laser thermal printer systems and existing graphics image formats such as PostScript or one of a number of other proprietary formats, mirroring the data can seriously impact throughput. Depending on how the raster color proofer operates, mirroring a full, four-color image can add several minutes of processing time.

Operations that mirror image data are typically memory-constrained since memory requirements for storing large color images are substantially greater than is normally used by raster color proofers. Also, these operations are disk-constrained since an image stored on disk cannot be mirrored quickly because this process would require numerous disk seeks, slowing processing. Depending on how pixels are stored, mirroring image data may also require substantial computer processing time or require dedicated processors such as for a bit-map image.

SUMMARY OF THE INVENTION

An object of the present invention is to provide a system capable of printing a direct image or a mirror image without substantial computer processing time to convert data.

According to one embodiment of the present invention, an imaging processor for thermal print medium comprises a vacuum imaging drum for holding thermal print medium and donor sheets, in registration, a printhead, wherein the rotation of the imaging drum is reversed to cause the printhead to write in both a forward and a reverse direction. The invention allows mirroring of image data by rotating the writing drum in the opposite direction.

According to another embodiment of the invention, the printhead is at an angle to the longitudinal axis of the imaging drum. In this embodiment, as the imaging drum is rotated in a reverse direction, channel delay signals are reversed when printing a mirror image.

This invention eliminates the need for complex mirroring algorithms in the raster color proofer and any requirements these algorithms would have for supporting memory, disk space, and processors.

DETAILED DESCRIPTION OF THE INVENTION

Figure 1:
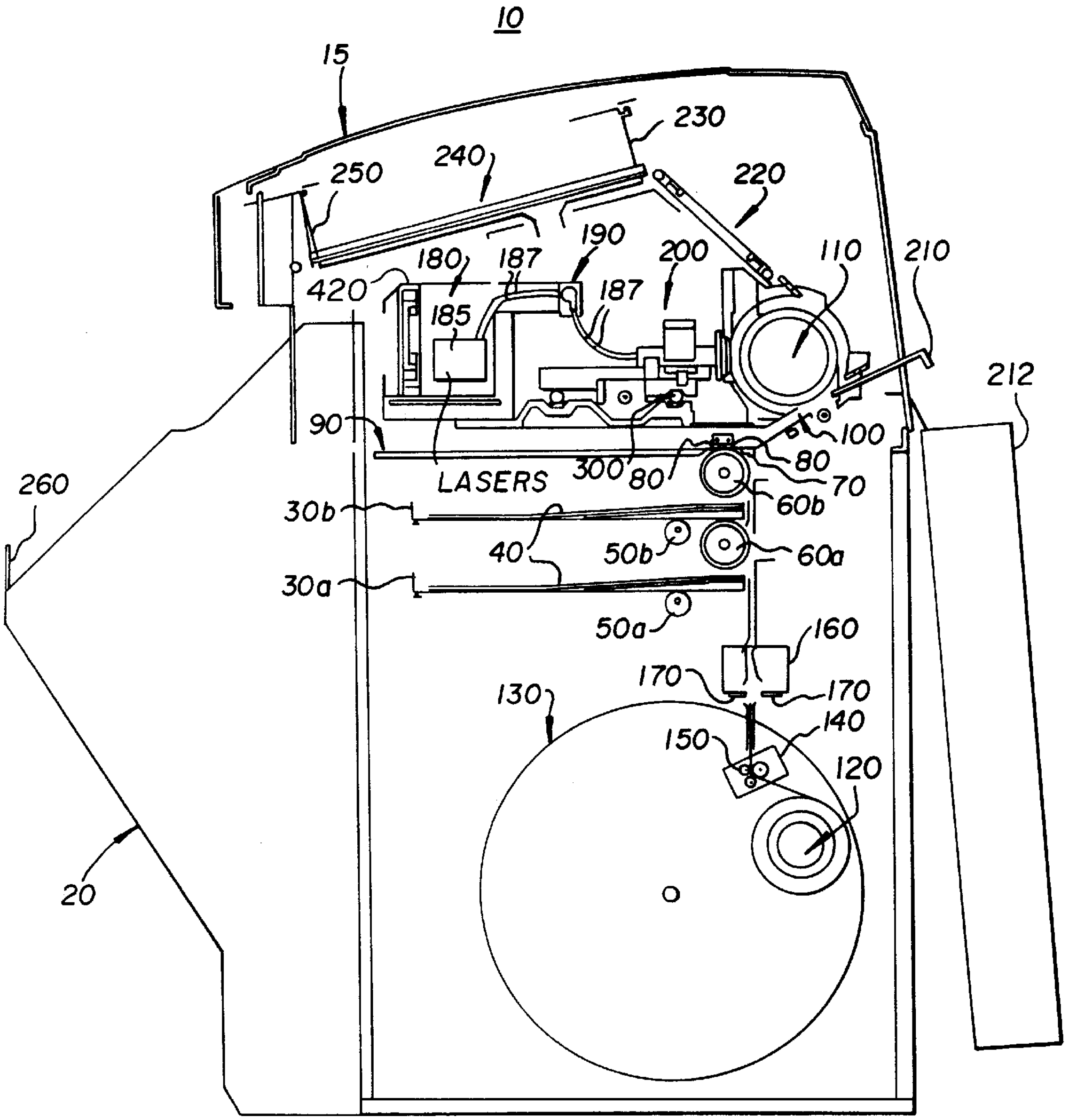
FIG. 1 is a side view in vertical cross section of a color proofer according to the present invention.

Referring to FIG. 1, there is illustrated a color printer 10 of the present invention having a housing 15 forming a protective cover. A movable, hinged door 20 is attached to a front portion of the housing 15 permitting access to two media trays, a lower tray **30*a* and upper tray 30*b*, that are positioned in an interior portion of the housing 15 for supporting thermal print medium 40, typically paper, thereon. It is obvious to those skilled in the art that only one media tray 30 will dispense thermal print medium 40 out of its paper tray 30 for creating an image thereon; the alternate media tray 30 either holds an alternative type of paper or functions as backup. In this regard, the lower media tray 30*a* includes a cam 50*a* for lifting the paper 40 upwardly toward a rotatable, lower media roller 60*a* and, ultimately, toward a second rotatable, upper media roller 60*b* which, when both are rotated, permits the thermal print medium 40 to be pulled upwardly towards a media guide 70. The upper media tray 30*b* also includes a cam 50*b* for lifting the thermal print medium 40 toward the upper media roller 60*b* which directs it towards the media guide 70**.

The movable media guide 70 directs the thermal print medium 40 under a pair of rollers 80 which engages the thermal print medium 40 for assisting the upper media roller **60*b* in directing it onto a staging tray 90. The media guide 70 is attached and hinged to the interior of the housing 15 at one end, and is uninhibited at its other end, permitting multiple positioning of the media guide 70. The media guide 70 then rotates its uninhibited end downwardly, in the position shown, and the direction of rotation of the upper media roller 60*b* is reversed, forcing the thermal print medium 40 resting on the staging tray 90 back under the rollers 80, upwardly through an entrance passageway 100 and around a rotatable imaging drum 110**.

Four rolls of donor material 120 (only one is shown) are connected to a carousel 130 in a lower portion of the housing 15, and each roll 120 includes a donor material 120 of a different color, typically black, yellow, magenta and cyan. These donor materials are ultimately cut into sheets and passed to the imaging drum for forming a donor material from which dyes imbedded therein are passed to the thermal print medium resting thereon, which process is described in detail herein below. In this regard, a drive mechanism 140 is attached to each roll 120, and includes three rollers 150 through which the donor material 120 of interest is rolled upwardly into a knife assembly 160. After the donor material 120 reaches a predetermined position, the rollers 150 cease driving the donor material 120 and two blades 170 positioned at the bottom portion of the knife assemble cut the donor material 120 into a sheet. The media rollers **60*a* and 60*b* and media guide 70 then pass the donor material 120 onto the drum 110 and in registration with the thermal print medium 40 using the same process as described above for passing the thermal print medium 40 onto the drum 110. The donor material 120 rests atop the thermal print medium 40 with a narrow gap between the two created by microbeads imbedded into the thermal print medium 40**.

A laser assembly 180 includes twenty lasers 185 in its interior, and these lasers are connected via fiber optic cables 187 to a distribution block 190 and ultimately to a printhead 200. The printhead 200 directs thermal energy received from the lasers 185 causing the donor material 120 to pass its dye across the gap to the thermal print medium 40. The printhead 200 is attached to a lead screw 310 via a nut (not shown in FIG. 1) for permitting it to move axially along the longitudinal axis of the drum 110 for writing data onto the thermal print medium 40.

For writing, the drum 110 rotates at a constant velocity, and the printhead 200 begins at one end of the thermal print medium 40 and traverses the entire length of the thermal print medium 40 for completing the transfer process for the particular donor material resting on the thermal print medium 40. After the donor material 120 has completed its dye transfer, the donor material 120 is then transferred from the drum 110 and out of the housing 15 via a skive or ejection chute 210. The donor material eventually comes to rest in a waste bin 212 for removal. The above-described process is then repeated for the other three rolls of donor material.

After all four sheets of donor material have transferred their dyes, the thermal print medium 40 is transported via a transport mechanism 220 through an entrance door 230 and into a dye binding assembly 240 where it rests against an exit door 250. The entrance door 230 is opened to permit the thermal print medium 40 to enter into the dye binding assembly 240, and shuts once it comes to rest in the dye binding assembly 240. The dye binding assembly 240 heats the thermal print medium 40 for further binding the transferred dye on the thermal print medium 40 and for sealing the microbeads thereon. After heating, the exit door 250 is opened and the thermal print medium 40 with the image thereon passes out of the housing 15 and comes to rest against a stop 260.

Figure 2:
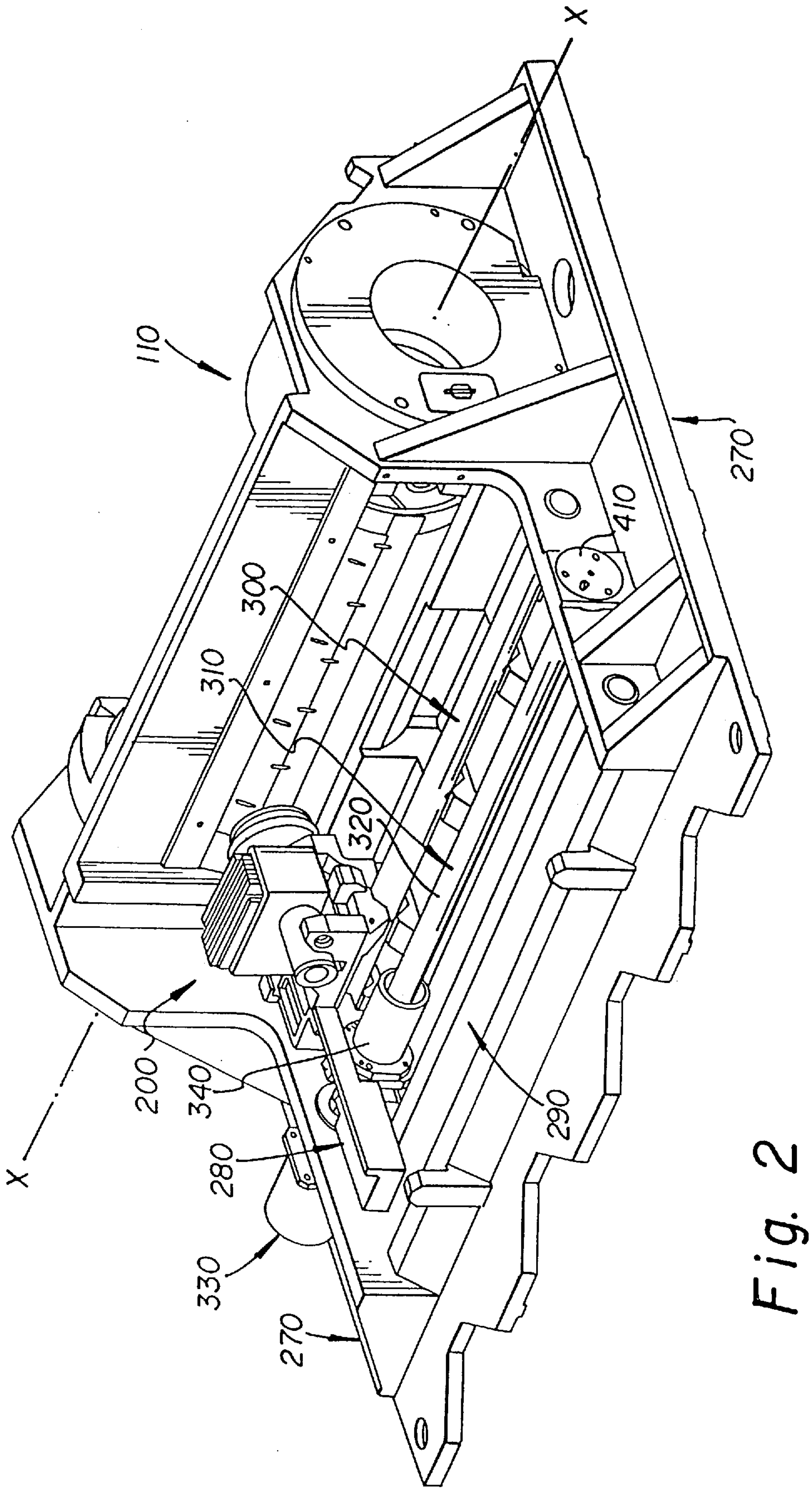
FIG. 2 is a perspective view of an imaging drum, printhead and lead screw of the present invention.

Referring to FIG. 2, there is illustrated a perspective view of the imaging drum 110 and printhead 200 of the color printer 10. The imaging drum 110 is mounted for rotation about an axis (x) in a frame support 270. The printhead 200 is movable with respect to the imaging drum 110, and is arranged to direct a beam of actinic light to the donor material 120 (shown in FIG. 1). The printhead 200 contains therein a plurality of writing elements (not shown) which can be individually modulated by electronic signals from the laser diodes 185, which signals are representative of the shape and color of the original image, so that each dye is heated to cause volatilization only in those areas in which its presence is required on the thermal print medium 40 to reconstruct the color of the original object.

The printhead 200 is mounted on a movable translator member 280 which, in turn, is supported for low friction slidable movement on bars 290 and 300. The bars 290 and 300 are sufficiently rigid so that they do not sag or distort between the mounting points at their ends and are arranged as parallel as possible with the axis (x) of the imaging drum 110. The upper bar 300 is arranged to locate the axis of the writing head 200 precisely on the axis (x) of the drum 110 with the axis of the writing head perpendicular to the drum axis (x). The upper bar 300 locates the translator member 280 in the vertical and the horizontal directions with respect to the axis of the drum 110. The lower bar 290 locates the translator member 280 only with respect to rotation of the translator about the bar 290 so that there is no over-constraint of the translator member 280 which might cause it to bind, chatter, or otherwise impart undesirable vibration to the writing head 200 during the generation of an image.

Figure 3:
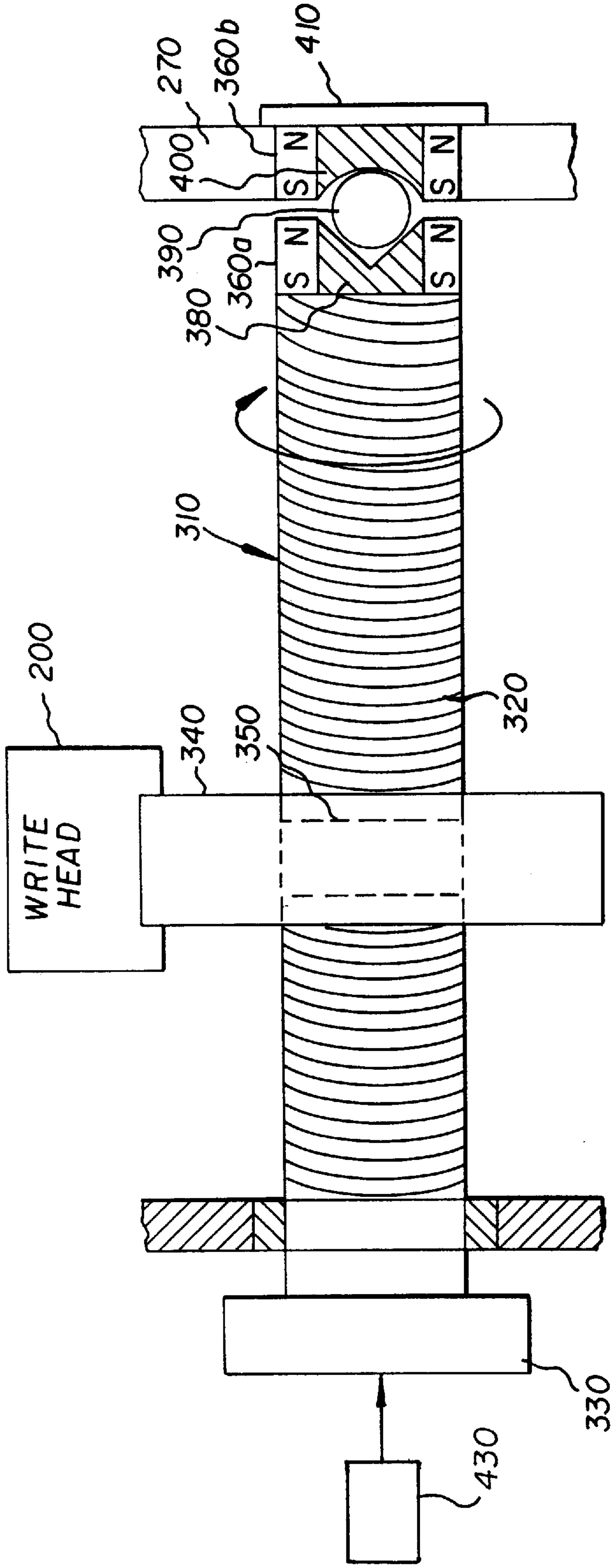
FIG. 3 is a top view in horizontal cross section, partially in phantom, of the lead screw.

Referring to FIGS. 2 and 3, a lead screw 310 includes an elongated, threaded shaft 320 which is attached to a motor 330 on its drive end and to the frame support 270. A nut 340 includes grooves in its hollowed-out center portion 350 for mating with the threads of the shaft 320 for permitting the nut 340 to move axially along the shaft 320 as the nut 340 is rotated. The nut 340 is integrally attached to the printhead 200 at its periphery so that as the shaft 320 is rotated by the motor 330 the nut 340 moves axially along the shaft 320 which, in turn, moves the writing head 200 axially along the drum 110.

As best illustrated in FIG. 3, an annular-shaped magnet 360*a* is integrally attached to the driven end of the shaft 320, and is in a spaced-apart relationship with another annular-shaped magnet 360*b* permanently attached to the frame support 270. The magnets 360 are preferably made of rare-earth materials such as neodymium-iron-boron. A generally circular-shaped insert 380 rests in an interior hollowed-out portion of the magnet 360*a*, and includes a generally V-shaped surface at one end for receiving a ball bearing 390 and a flat surface at its other end for abuttingly attaching to one end of the shaft 320. Another circular-shaped insert 400 is placed in the other magnet 360*b*, and includes an arcuate-shaped surface on one end for receiving the ball bearing 390, and a flat surface at its other end for receiving an end cap 410 placed over the magnet 360*b* and attached to the frame support 270 for protectively covering the magnet 360*b*. Both inserts 380 and 400 are preferably made of materials such as Rulon J or Delrin A F, both well known in the art.

The lead screw operates as follows. The motor 330 is energized and imparts rotation to the lead screw 310, as indicated by the arrows, causing the nut to move axially along the shaft. The magnets 360 are magnetically attracted to each other which prevents axial movement of the lead screw 310. The ball bearing 390, however, permits rotation by maintaining the positional relationship of the magnets 360, i.e., slightly spaced apart, which prevents mechanical friction between them while obviously permitting the shaft 320 to rotate.

Figure 4:
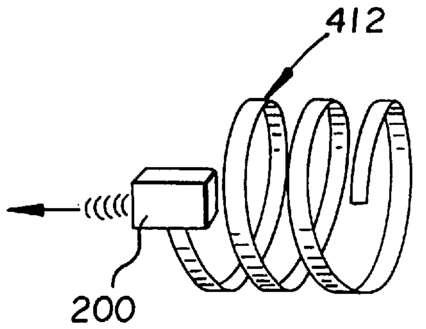
FIG. 4 is a perspective view of a printing swath created by drum rotation and lead screw movement for direct printing to an intermediate receiver.

The printhead 200 travels in a path along the imaging drum 110, moved at a speed synchronous with drum rotation and proportional to the width of the writing swath 412, as shown in FIG. 4. The pattern that the head traces out along the spinning drum is a helix. The swaths traced out on the drum are shown separated for purposes of clarity, in actual operation, each swath would be directly adjacent the previous swath traced out on the surface of the imaging drum 110.

Figure 5:
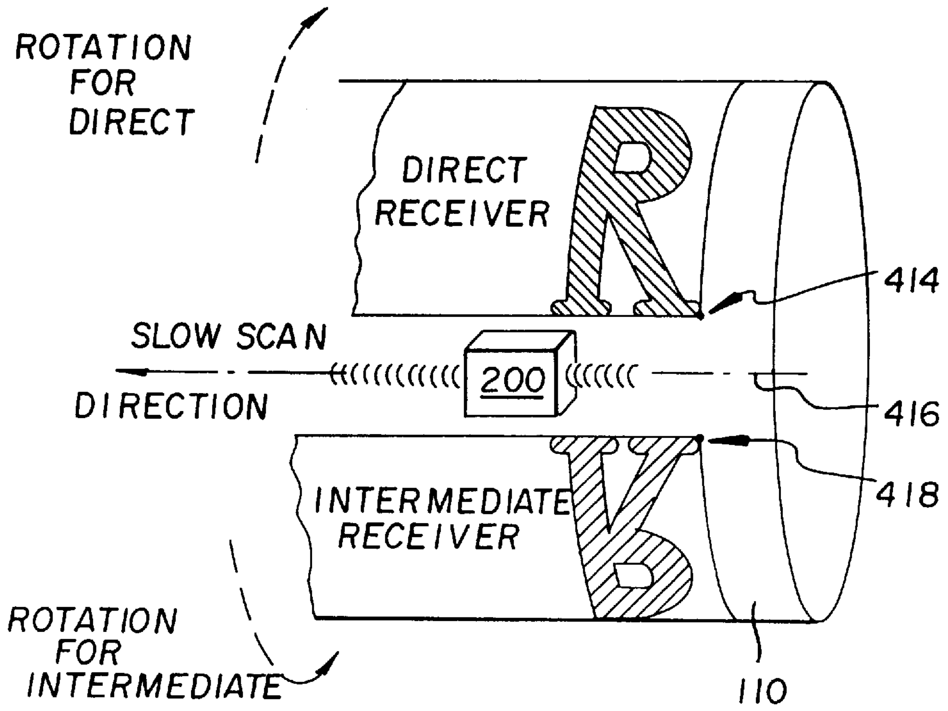
FIG. 5 is a perspective view of the imaging drum and the orientation of mirrored data according to the present invention.
Figure 6:
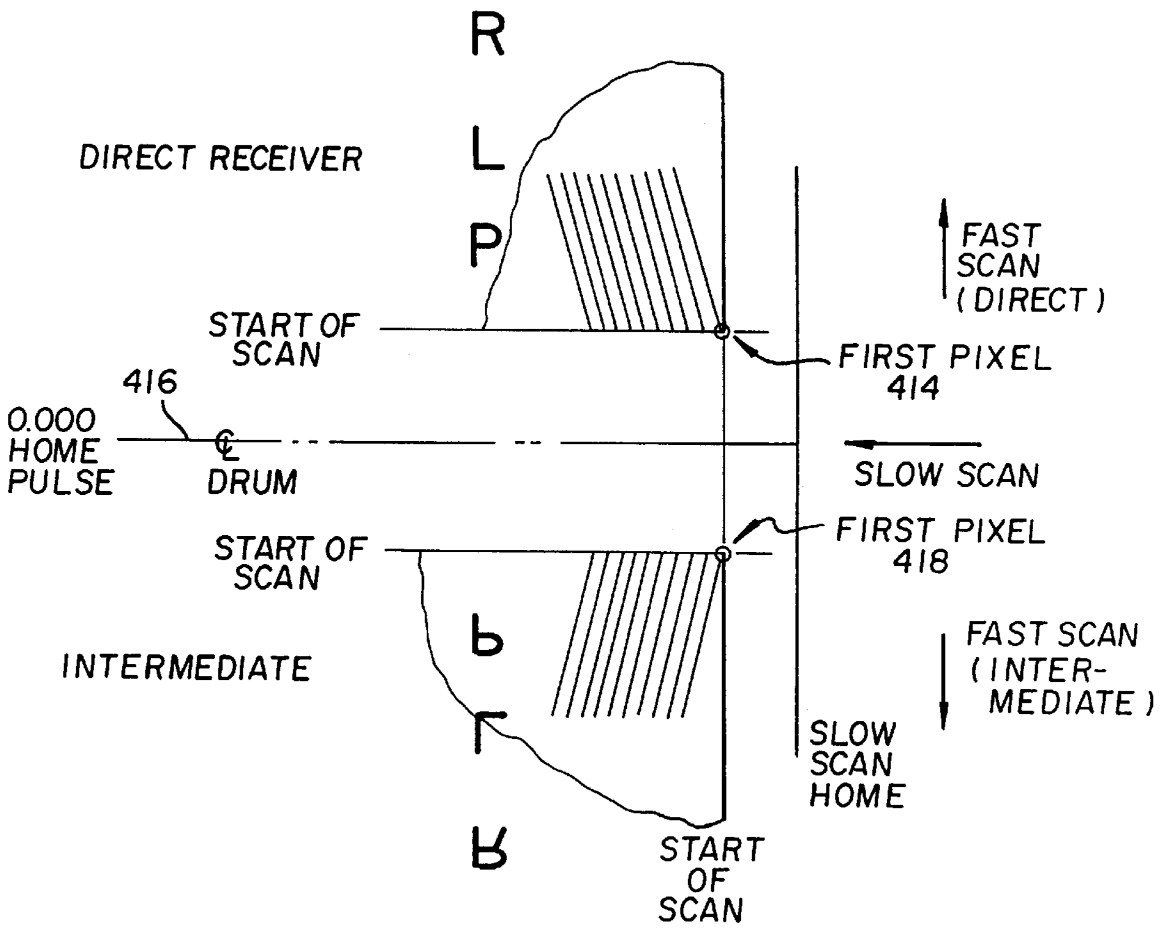
FIG. 6 shows a plan view of the imaging drum and the orientation of mirrored data according to the present invention.

The printhead 200 has a point at which it writes the first pixel 414, as shown in FIG. 5 and FIG. 6, relative to the final image. First pixel 414 is a fixed distance from the optical centerline 416 of the imaging drum. This means that the printhead 200 writes the first pixel 414 for direct printing at a fixed distance on the surface of the drum 110 after the drum has rotated past the printhead. In the case of writing directly to a thermal print media, the image appears as it would be seen by the end user, as shown in the top half of FIGS. 5 and 6.

In the case where the image is being printed to an intermediate, as shown in the bottom half of FIGS. 5 and 6, the image appears to be a mirror image of what the final end product will be. In writing a mirror image to an intermediate, the first pixel 418 at the start of the scan will be same distance from the optical centerline 416 in the opposite direction that first pixel 414 was from the optical centerline 416. This means that the same image data can be used to write the first pixel for either receiver type, provided that the drum direction of rotation is the correct one for that receiver type, eliminating the need for complex algorithms to reverse the image using software.

In another embodiment of the invention having a canted printhead, channel delays are used to insure proper placement of pixels on a scan line approximately parallel to the horizontal axis of the drum 110. At a trailing end of each scan, the printhead stops writing by activating successively fewer pixels so that the net effect is a rectangular image area. Likewise, at a leading end the printhead starts writing by activating successively more pixels so that the net effect is a rectangular image area. Because the drum is rotating, the printhead incorporates a set of channel delays so that the pixels line up correctly on the output image. In order to write to a drum spinning in the reverse direction, these delays are reversed. Channel delay timing is executed by software embedded in the head controller logic circuit 420, shown in FIG. 1.

This invention allows the same image data to be used to write to both direct and intermediate receivers without any mirroring preprocessing by the computer software. The imaging system 430, shown in FIG. 3, simply controls the drum to spin in the direction that is appropriate for the intended media. In addition, this invention allows the data-writing process to begin as soon as image data is ready, without the need for mirroring. Also the raster color proofer that sends data to the printhead can send the same data to the head for either a direct proof sheet or for an intermediate. For printing applications, this means that the exact data used to create a proof on one type of direct media can be used to create the proof on a number of different types of media using an intermediate. This speeds the throughput of the laser thermal printer that would otherwise need to mirror the data before it could begin processing.

The invention has been described in detail with particular reference to a preferred embodiment thereof, but it will be understood that variations and modifications can be effected within the spirit and scope of the invention as described hereinabove and as defined in the appended claims.

We claim:

1. An image processing apparatus for writing images in a forward direction and a reverse direction comprising:

a printhead having a plurality of light sources;

a lead screw for moving said printhead;

an imaging drum;

thermal print medium mounted on said imaging drum; and a motor for rotating said imaging drum in a forward direction and a reverse direction for writing a direct image on said thermal media when said imaging drum rotates in a forward direction;

an imaging system for writing a mirror image on said thermal medium as said imaging drum rotates in reverse direction.

2. An image processing apparatus according to claim 1 wherein:

said printhead is at an angle to an axis of rotation of said drum; and a head controller logic circuit which reverses a channel delay signal to said light sources as said motor rotates in a reverse direction.

3. An image processing apparatus according to claim 1 wherein a plurality of lasers is connected to said printhead by a plurality of fiber-optics to produce said light sources.

4. An image processing apparatus according to claim 1 wherein said image processing apparatus is a color proofer.

5. An image processing apparatus according to claim 1 wherein said image processing apparatus is a laser thermal printer.

6. An image processing apparatus according to claim 1 wherein a donor overlays said thermal print medium and said printhead writes an image to said thermal print medium by transferring dye from said donor to said thermal print medium.

7. A method of writing a direct image or a mirror image to a thermal print medium comprising the steps of:

securing said thermal print medium to an imaging drum;

securing a donor sheet on top of said thermal print medium;

rotating said imaging drum in a first direction;

moving a printhead in a horizontal direction along the line approximately parallel to a centerline of rotation of said imaging drum;

transmitting an image signal to said printhead, causing said printhead to emit beams of light forming a direct image on said thermal print medium;

rotating said imaging drum in a second direction; and printing a mirror image on said thermal.

8. An imaging processing apparatus according to claim 1 comprising a head controller logic circuit for reversing channel delays to said printhead when said drum rotates in a reverse direction.

9. A method of writing a direct image or reverse image as in claim 7 further comprising the step of:

reversing channel delays when said imaging drum rotates in a reverse direction.

* * * * *